US006199256B1

(12) United States Patent
Revnew et al.

(10) Patent No.: US 6,199,256 B1
(45) Date of Patent: Mar. 13, 2001

(54) METHOD AND APPARATUS FOR APPLICATION OF SLIDER MECHANISM TO RECLOSEABLE FLEXIBLE PACKAGING

(75) Inventors: Michael D. Revnew, Appleton; Andrew J. Gulotta, Oshkosh; Lawrence W. Wirth, Neenah, all of WI (US)

(73) Assignee: Reynolds Consumer Products, Inc., Richmond, VA (US)

( * ) Notice: Subject to any disclaimer, the term of this patent is extended or adjusted under 35 U.S.C. 154(b) by 0 days.

(21) Appl. No.: 09/351,830

(22) Filed: Jul. 12, 1999

(51) Int. Cl.[7] .............................. B29D 5/00; A41H 37/06

(52) U.S. Cl. ................................ 29/408; 29/768; 29/771; 383/64

(58) Field of Search .............................. 29/408, 409, 768, 29/771; 24/399, 400; 53/133.4, 139.2; 383/64; 493/213, 927

(56) References Cited

U.S. PATENT DOCUMENTS 3,115,689 12/1963 Jacobs .
3,122,807 3/1964 Ausnit .
3,230,593 1/1966 Herz .
3,324,520 6/1967 Ausnit .
3,426,396 2/1969 Laguerre .
3,660,875 5/1972 Gutman .
3,701,191 10/1972 Laguerre .
3,701,192 10/1972 Laguerre .
3,713,923 1/1973 Laguerre .
3,790,992 2/1974 Herz .
3,806,998 4/1974 Laguerre .
3,951,716 * 4/1976 Takamatsu ............................. 29/408
4,262,395 4/1981 Kosky .
4,581,006 4/1986 Hugues et al. .
5,067,208 11/1991 Herrington, Jr. et al. .
5,088,971 2/1992 Herrington .
5,131,121 7/1992 Herrington, Jr. et al. .
5,211,482 5/1993 Tilman .
5,283,932 2/1994 Richardson et al. .
5,431,760 7/1995 Donovan .
5,769,772 6/1998 Wiley .
5,788,378 8/1998 Thomas .
5,833,791 10/1998 Bryniarski et al. .

* cited by examiner

*Primary Examiner*—P. W. Echols

(57) ABSTRACT

Methods for mounting a slider device on a recloseable package include mounting the slider device by expanding the leg construction of the slider device with an expanding track to allow mounting of the slider on a recloseable zipper construction. A particular method includes providing a slider device to a slider positioner, such as a carousel, moving the slider along an expanding track, and mounting the expanded slider device onto the recloseable mechanism at the end of the track.

20 Claims, 11 Drawing Sheets

130
10B
10B
10C
10C
10D
10D
10E
10E
130

50
130

50
130

50
130

50

METHOD AND APPARATUS FOR APPLICATION OF SLIDER MECHANISM TO RECLOSEABLE FLEXIBLE PACKAGING

FIELD OF THE INVENTION

The present invention generally relates to closure arrangements for polymer packages, such as, plastic bags. In particular, the present invention relates to recloseable closure mechanisms or zipper-type closures for packages, methods, and apparatus for applying slider devices to zipper-type closures.

BACKGROUND

Many packaging applications use resealable or recloseable containers to store or enclose various types of articles and materials. These packages may be used to store food products, non-food consumer goods, medical supplies, waste materials, and many other articles. Resealable packages are convenient in that they can be closed and resealed after the initial opening to preserve the enclosed contents. The need to locate a storage container for the unused portion of the products in the package is thus avoided. In some instances, providing products in resealable packages appreciably enhances the marketability of those products.

Some types of resealable packages are opened and closed using a slider device. Sliding the slider device in a first direction opens the package to allow access to the interior of the package, and sliding the slider device in an opposite second direction seals the package. The slider device typically includes a separator or spreader-type structure at one end that opens and closes a profiled closure mechanism on the resealable package, depending on the direction of movement. The sidewalls of the slider device are configured so that the sidewalls engage the closure profiles and progressively move them into engagement to close the resealable package when the slider device is moved along the closure mechanism in a direction opposite the first direction.

With the growing popularity of these slider closure mechanisms, there is a desire o improve the processes used to attach the slider device to the resealable package with the profiled closure mechanism.

SUMMARY OF THE DISCLOSURE

The present invention relates to methods and apparatuses for mounting a slider device onto flexible packages comprising a recloseable closure mechanism, such as a "zipper-type" closure mechanism.

In particular, an embodiment of the invention relates to a method of mounting a slider device on a recloseable closure arrangement for a recloseable package, comprising mounting the slider device onto the closure arrangement by expanding the slider device so as to increase the distance between the first and second leg constructions to a second distance, wherein the expanding comprises moving the slider device along an expanding device, such as a track; removing the slider device from the expanding device, and mounting the slider device onto recloseable closure mechanism. When the slider device is mounted on the recloseable closure mechanism, the second distance between the first and second leg constructions is preferably returned to the original first distance.

In another embodiment the invention relates to an apparatus for mounting a slider device on a recloseable closure mechanism comprising a slider device positioner system, in particular a rotating carousel, and a slider distorting system comprising a track to expand the slider device. Once distorted, the slider device can be aligned with the recloseable closure mechanism and mounted thereon. Preferably, the rotating carousel comprises a radially extending post, more preferably a plurality of radially extending posts.

The above summary of principles of the present disclosure is not intended to describe each illustrated embodiment or every implementation. The figures and the detailed description that follow more particularly exemplify certain preferred embodiments utilizing the principles disclosed herein.

BRIEF DESCRIPTION OF THE DRAWINGS

Principles of this disclosure may be more completely understood in consideration of the detailed description of various embodiments of the invention that follows in connection with the accompanying drawings in which.

DETAILED DESCRIPTION

The present invention is applicable to applying a slider device to a variety of packaging arrangements. An appreciation of various aspects of the invention is best gained through a discussion of examples of such a packaging arrangement and the slider device.

A. The Package and Closure Construction

Figure 1:
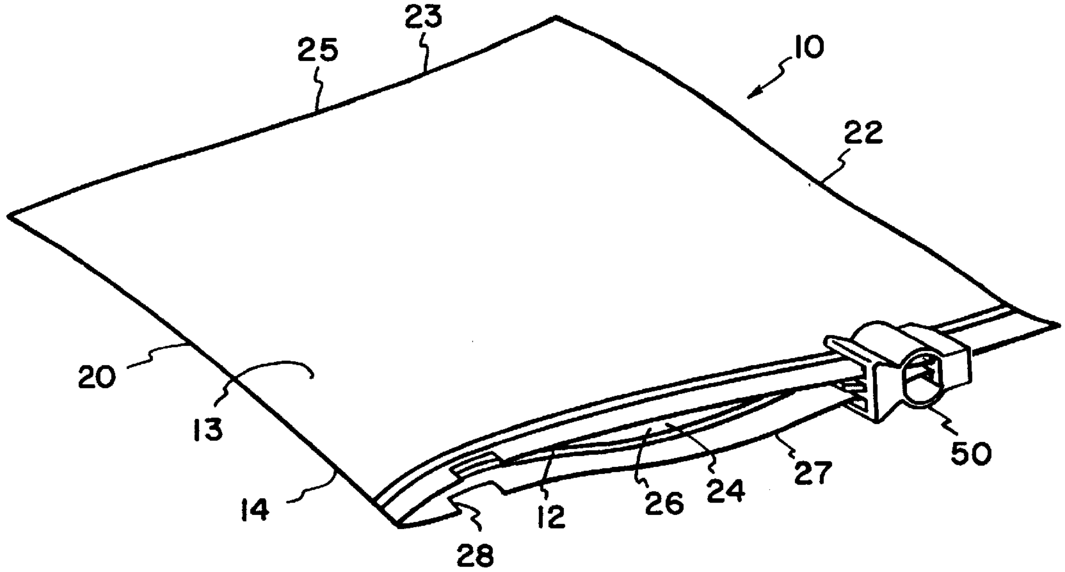
FIG. 1 is a perspective view of a flexible, recloseable package having a slider device.

Attention is directed to FIG. 1, which illustrates an example packaging arrangement in the form of a recloseable, flexible package 10, for example, a polymeric package such as a plastic bag, having a recloseable closure mechanism 12, for example, interlocking profiled elements, and a slider device for opening and closing the closure mechanism 12. In addition to being recloseable, package 10 may be resealable; that is, closure mechanism 12 not only closes package 10 but also seals package 10.

The flexible package 10 includes first and second opposed panel sections 13, 14, typically made from a flexible, polymeric, plastic film. With some manufacturing applications, the first and second panel sections 13, 14 are heat-sealed together along two side edges 20, 22 and meet at a fold line 23 in order to form a three-edged containment section for a product within an interior 24 of the package 10. In the embodiment shown, the fold line 23 comprises the bottom edge 25 of the package 10. Alternatively, two separate panel sections 13, 14 of plastic film may be used and heatsealed together along the two side edges 20, 22 and at the bottom edge 25. Access is provided to the interior 24 of the package 10 through a mouth 26 at a top edge 27 of the package. In the particular embodiment shown, the mouth 26 extends the width of the package 10.

The recloseable closure mechanism 12 is illustrated in FIG. 1 at the mouth 26 of the flexible package 10. Alternatively, the closure mechanism 12 could be positioned on the package 10 at a location different from the mouth 26 of the package 10, depending on the application needs for the package 10. The recloseable closure mechanism 12 can be one of a variety of closure mechanisms. In the particular embodiment illustrated in FIG. 2, the recloseable closure mechanism 12 is shown in the specific form of a zipper-type closure mechanism. By the term "zipper-type closure mechanism," it is meant a structure having opposite interlocking or mating profiled elements that under the application of pressure will interlock and close the region between the profiles.

Figure 2:
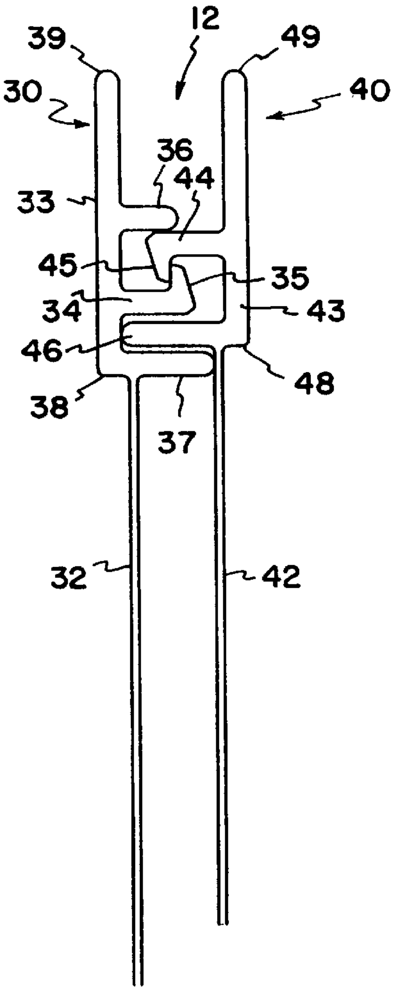
FIG. 2 is a cross-sectional view of profiled elements usable with the recloseable package of FIG. 1.

In particular, the zipper-type closure mechanism in FIG. 2 is an illustration of one example of a closure mechanism 12. The closure mechanism 12 includes an elongated first closure profile 30 and an elongated second closure profile 40. Typically, the closure profiles 30, 40 are manufactured separately from each other.

Still in reference to FIG. 2, the preferred first closure profile 30 depicted includes a sealing flange or bonding strip 32, a base strip 33, a first closure member 34, first and second guide posts 36, 37, and an upper flange 39. The closure member 34 extends from the base strip 33 and is generally projecting from the base strip 33. At a free end or tip of the closure member 34 is a hook or catch 35. The guide posts 36, 37 also extend from the base strip 33 and are generally projecting from the base strip 33. The guide posts 36, 37 aid in holding the closure mechanism 12 closed and in aligning the first closure profile 30 with the second closure profile 40 for interlocking. The bonding strip 32 depends or extends downward from the second guide post 37 and can be attached to a first panel section, such as the first panel section 13 of the package 10 of FIG. 1. A first shoulder 38 is defined by the intersection of the base strip 33 and bonding strip 32. In the example illustrated, the bonding strip 32 is spaced a distance laterally from the base strip 33 to define a comer forming the shoulder 38. The upper flange 39 extends upwardly from the base strip 33 and first guide post 36.

The preferred second closure profile 40 depicted includes a bonding strip 42, a base strip 43, a closure member 44, a guide post 46, and an upper flange 49. The closure member 44 extends from the base strip 43 and is generally projecting from the base strip 43. At a free end or tip of the closure member 44 is a hook or catch 45. The guide post 46 also extends from the base strip 43 and is generally projecting from the base strip 43. The guide post 46 aids in holding the closure mechanism 12 closed and aids in aligning the second closure profile 40 with the first closure profile 30 for interlocking. The bonding strip 42 depends or extends downward from the guide post 46 and can be attached to a second panel section, such as the second panel section 14 of the package 10 of FIG. 1. A shoulder 48, analogous to the shoulder 38, is formed at the comer of the bonding strip 42 and guide post 46.

The first and second closure profiles 30, 40 are designed to engage with one another to form the recloseable closure mechanism 12. The closure member 34 of the first closure profile 30 extends from the base strip 33 an engagement distance. The closure member 44 of the second closure profile 40 also extends from the base strip 43 an engagement distance. These engagement distances that the closure members 34, 44 extend are sufficient to allow mechanical engagement, or interlocking, between the first closure member 34 of the first closure profile 30 and the closure member 44 of the second closure profile 40. In particular, the catches 35, 45 hook or engage each other. Furthermore, the closure profiles 30, 40 are sealed together at their ends, such as at side edges 20, 22 in FIG. 1, to further aid in aligning the closure profiles 30, 40 for interlocking through processes such as ultrasonic crushing or welding. Pressure is applied to the closure profiles 30, 40 as they engage to form the openable sealed closure mechanism 12. Pulling the first closure profile 30 and the second closure profile 40 away from each other causes the two closure profiles 30, 40 to disengage, opening the package 10 of FIG. 1. This provides access to the interior 24 of the package 10 through the mouth 26.

In some applications, the closure profiles 30, 40 are formed by two separate extrusions or through two separate openings of a common extrusion. Typically, the recloseable closure mechanism 12 is made of a polymer, plastic material, such as polyethylene or polypropylene. In one example embodiment, the closure arrangement illustrated in FIG. 2 is manufactured using conventional extrusion and heat sealing techniques.

Figure 5:
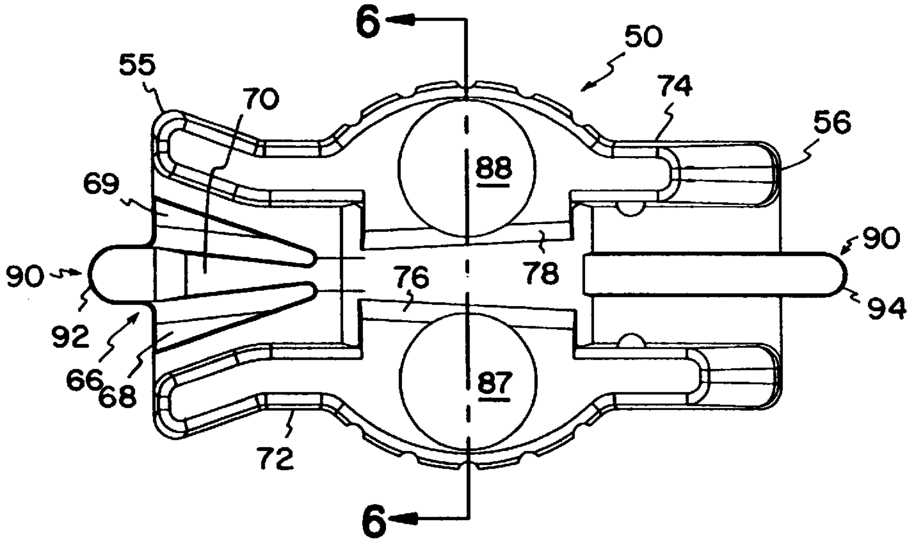
FIG. 5 is a bottom plan view of the slider device depicted in FIGS. 3 and 4.

Attention is again directed to FIG. 1. In FIG. 1, note that there is a cutout or notch 28 formed in the upper flanges 39, 49 (FIG. 2) of the closure mechanism 12. The preferred notch 28 shown includes three straight edges or sides and is formed twice as long as the length of the spreader 66 of slider 50 (FIG. 5). As to be explained in further detail below, the notch 28 serves as a "parking place" for a slider device 50 and may also facilitate mounting the slider device 50 onto the resealable package 10 during initial assembly. In addition, the edge closest to the side seal 20 helps to create a stop member for the slider device 50.

B. The Slider Device

Figure 3:
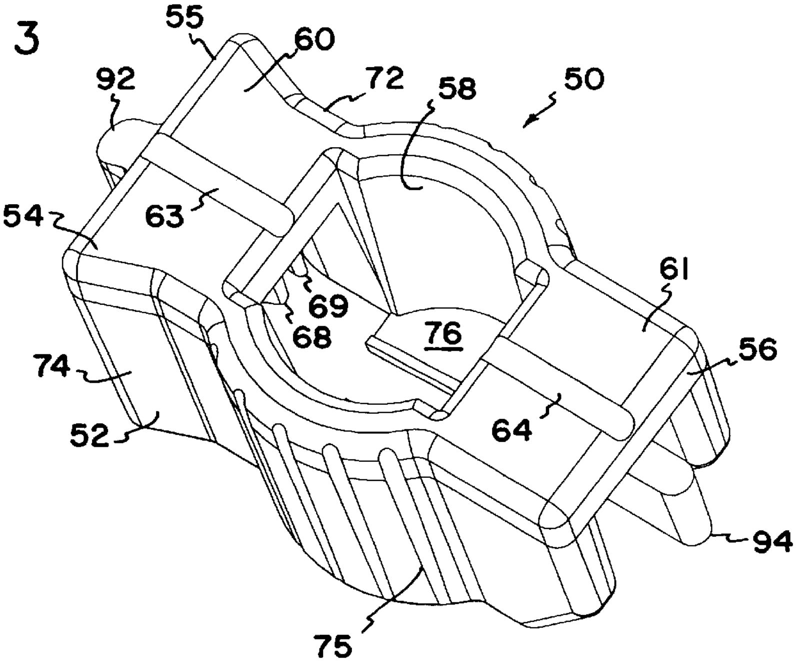
FIG. 3 is an enlarged, top perspective view of the slider device of FIG. 1.
Figure 4:
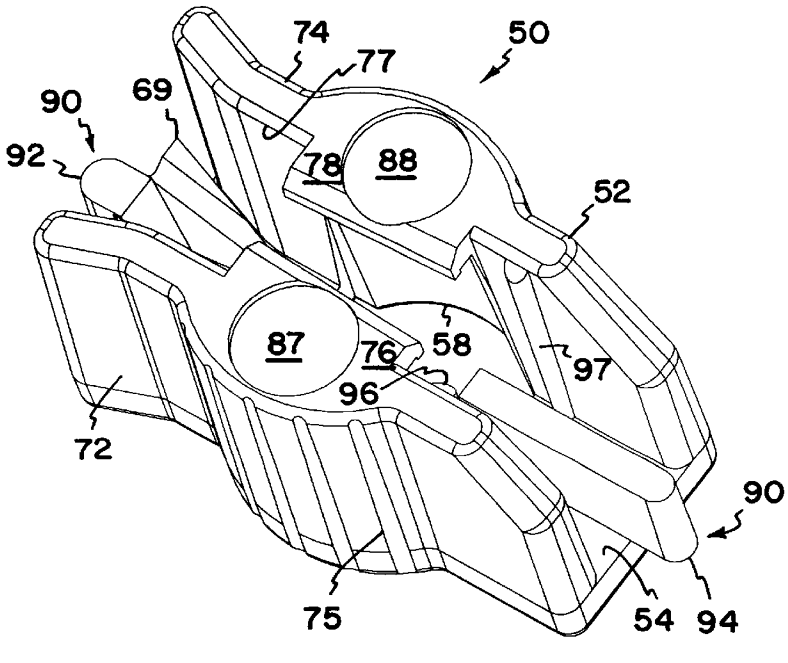
FIG. 4 is an enlarged, bottom perspective view of the slider device of FIGS. 1 and 3.

Still referring to FIG. 1, the slider device 50 is provided to open and close the 30 closure mechanism 12. Attention is now directed to FIGS. 3 and 4. One preferred slider device 50 is illustrated in FIGS. 3 and 4 in perspective view and preferably comprises a one-piece unitary, molded plastic member with no moveable parts. In general, the slider device 50 includes a housing 52 for slidably engaging the closure mechanism 12. The housing 52 is movable between a closed position of the package 10 when the housing 52 is adjacent the side edge 20 and an open position of the package 10 when the housing 52 is adjacent the side edge 22. FIG. 1 illustrates the resealable package 10 in a predominantly open position. The housing 52 slides over the closure mechanism 12 relative to the top edge 27 of the recloseable package 10 to open and close mouth 26.

The housing 52 is preferably a multi-sided container configured for engaging or locking onto or over the closure mechanism 12. In the particular embodiment illustrated in FIGS. 3 and 4, the housing 52 includes a top wall 54. By the term "top", it is meant that in the orientation of the slider device 50 shown in FIG. 3, the wall 54 is oriented above the remaining portions of the housing 52. It should be understood, of course, that if the housing 52 is moved from the orientation shown in FIG. 3, the top wall 54 will not be in a top orientation. The top wall 54 defines a first end 55 and an opposite second end 56. The top wall 54 also defines an open aperture 58. The open aperture 58 divides the top wall 54 between a first portion 60 and a second portion 61. The first portion 60 generally comprises a flat, planar portion in extension from a periphery of the open aperture 58 to the edge defined by the first end 55. Similarly, the second portion 61 generally comprises a flat, planar portion in extension from a periphery of the open aperture 58 to the edge defined by the second end 56. Each of the first and second portions 60, 61 defines a groove 63, 64 respectively. The aperture 58 and grooves 63, 64 aid in providing a structure that may be more easily injection molded.

The housing 52 includes a separation structure for separating the first and second closure profiles 30, 40. That is, when the closure mechanism 12 is in a closed state such that the closure members 34, 44 are interlocked, the separation structure will apply a force to wedge open and pull the closure members 34, 44 apart from each other. In the embodiment illustrated, the housing 52 includes a plow or spreader 66 operating as a separation structure. The spreader 66, in the preferred embodiment shown, extends or depends from the top wall 54. Preferably, the spreader 66 comprises first and second angled wedges 68, 69 separated by a gap 70 (FIG. 5) therebetween.

In FIG. 5, it can be seen that the first and second wedges 68, 69 are angled toward each other, from the first end 55 of the slider device 50 to an opposite end of the wedges 68, 69, to form an overall triangular shaped spreader 66. The gap 70 between the first wedge 68 and second wedge 69 helps to contribute to convenient manufacturing techniques for the housing 52, such as injection molding. Preferably, the spreader 66 only extends partially in the resealable closure mechanism 12. More preferably, the spreader 66 only extends between the open flanges 39, 49 and does not penetrate the closure members 34, 44. This helps to ensure a leak-proof closure mechanism 12. In the preferred embodiment shown, the spreader 66 preferably extends about 0.125 inch from the first portion 60 of the top wall 54.

In reference again to FIGS. 3 and 4, the preferred housing 52 shown also includes first and second side walls 72, 74. Preferably, each of the first and second sidewalls 72, 74 extends from and is cantilevered from the top wall 54 to form a slide channel 77 therebetween. In preferred embodiments, the first and second sidewalls 72, 74 are injection molded with the remaining parts of the housing 52. In other words, preferably the housing 52 comprises a single, unitary, integral piece of material with no additional materials welded, fastened, or bolted together. As can be viewed in FIGS. 3 and 4, the sidewalls 72, 74 can include texturization, such as ribs 75, to help improve gripping and handling by the user. In FIG. 5, note that the sidewalls 72, 74 diverge away from each other at the first end 55 in the first portion 60, form convex portions in a middle section, and are generally parallel in the second portion 61. These features also facilitate gripping and handling by the user.

Preferably, the housing 52 includes a system for permitting the housing 52 to slide along the closure mechanism 12 without becoming disengaged from the resealable package 10. In the embodiment illustrated, the system of the slider housing 52 engages or interlocks with certain structure of the closure mechanism 12. In particular, the housing 52 has a first and a second engaging leg construction 76, 78. The first leg construction 76 preferably extends from the first sidewall 72 in a portion of the housing 52 that is under the open aperture 58. As illustrated in FIGS. 3 through 7, the leg constructions are preferably hooking constructions.

Figure 6:
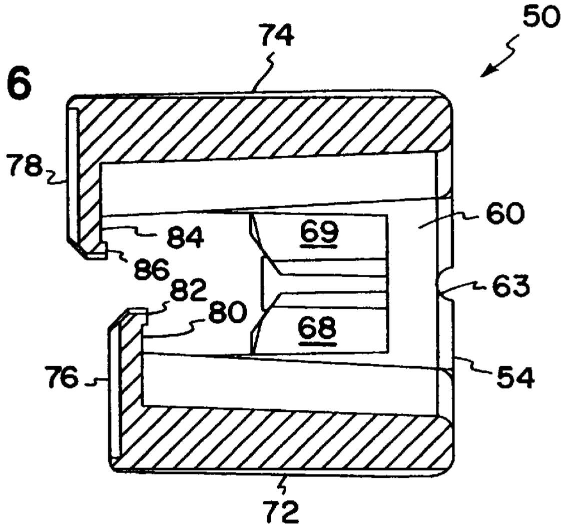
FIG. 6 is a cross-sectional view of the slider device depicted in FIG. 5 taken along the line 6—6 of FIG. 5.

In reference now to FIG. 6, first hooking construction 76 preferably includes a flange 80 in lateral extension from the first sidewall 72. Extending or projecting from flange 80 is a tip 82 oriented toward the top wall 54. As such, the tip 82, in combination with the flange 80, forms a hook or catch for slidable engagement with the shoulder 48 of the second closure profile 40.

Analogously, second hooking construction 78 preferably extends from the second sidewall 74 and includes a flange 84 in extension from the second sidewall 74 and in a region of the housing 52 below the open aperture 58. A tip 86 projects or extends from flange 84 in a direction oriented toward the top wall 54. As such, the flange 84 and tip 86 cooperate to form a hook or catch for engaging in a slidable manner with the shoulder 38 of the first closure profile 30. As can be seen in FIG. 6, the first hooking construction 76 is located closer to the top wall 54 than the second hooking construction 78. This is generally because, in the embodiment shown, the second sidewall 74 is longer than the first sidewall 72.

Attention is again directed to FIGS. 4 and 5. Each of the first and second hooking constructions 76, 78 has circular, partial cavities 87, 88, respectively, formed therein. These cavities 87, 88 help facilitate convenient manufacturing techniques, such as injection molding.

The slider device 50 preferably includes a system for guiding the slider device 50 between the side edges 20, 22 (FIG. 1) and for preventing the slider device 50 from sliding off the edge of the package 10 (FIG. 1). In the embodiment illustrated, the system includes a guide construction 90 (FIG. 4). Preferably, the guide construction 90 is designed to project beyond the first and second ends 55, 56 of the top wall 54. This ensures that the guide construction 90 detects the side edges 20, 22 before any other structure on the housing 52 engages the sides 20, 22 of the package 10. Preferably, the guide construction 90 depends from the top wall 54, but could depend from other portions of the housing 52 in other embodiments.

While a variety of structures are contemplated, in the particular embodiment illustrated in the drawings, the guide construction 90 comprises first and second bumpers or elongate fingers 92, 94. The first bumper or finger 92 preferably is molded as part of the housing 52 to extend a distance of at least about 0.06 inch (1.5 mm) beyond the first end 55 of the first portion 60. The second bumper or finger 94 likewise is preferably molded as part of the housing 52 to extend a distance of at least 0.06 inch (1.5 mm) beyond the second end 56 of the second portion 61.

In operation, the first finger 92 will abut or engage the side edge 20 to help contribute to preventing the housing 52 from sliding off of the resealable package 10. Analogously, the second finger 94 will abut or engage the side edge 22 to prevent the housing 52 from sliding off of the recloseable package 10. Thus, the guide construction 90 keeps the housing 52 within the boundaries or periphery defined by the side edges 20 and 22.

Attention is again directed to FIGS. 4 and 5. In the preferred embodiment, the housing 52 includes a system for reducing drag. That is, the housing 52 is designed such that the surface area contact between the housing 52 and the closure mechanism 12 is minimal. In the embodiment illustrated, the system includes first and second drag reducing standoffs 96, 97. The first standoff 96 preferably projects or extends from the first sidewall 72 as a protrusion or pin or rod. Likewise, the second standoff 97 projects or extends from the second sidewall 74. In the preferred embodiment illustrated, the first and second standoffs 96, 97 project at least about 0.0085 inch (0.22 mm) from their respective sidewalls 72, 74. Preferably, the first standoff 96 extends the entire length between the bottom of the first sidewall 72 and the top wall 54. Likewise, preferably the second standoff 97 extends the entire length between the top wall 54 and the bottom edge of the second sidewall 74.

In operation, the standoffs 96, 97 slidably communicate with the first and second closure profiles 30, 40, respectively. Because of the projection and extension of the standoffs 96, 97 relative to the remaining portions of the housing 52, the amount of surface area contact or material inducing friction between the housing 52 and the closure mechanism 12 is minimized. This permits easier manipulation of the slider device 50 by the user.

To operate, the slider device 50 may be slid relative to the closure mechanism 12 in a first direction or an opposite second direction. As the housing 52 is moved from the closed position to the open position, the spreader 66 forces the closure members 34, 44 apart from each other. The spreader 66 is spaced between the upper flanges 39, 49 of the profile members 30, 40 and opens the mouth 26 of the package 10 as the slider housing 52 is moved along the resealable package 10 in the direction toward where the triangle of spreader 66 "points." The opening happens because the triangular shape of the spreader 66 operates as a cam to force the profile members 30, 40 apart, and thus to disengage the interlocking members 34, 44. To close the closure mechanism 12, the slider housing 12 is moved relative to the closure mechanism 12 in the opposite direction. The closing happens because the slide channel 77 between the sidewalls 72, 74 is narrower at end 56 (the end away from the spreader 66) and is wider at the end 55 (the end near the spreader 66). The spreader 66 does not depend very far downwardly into the closure mechanism 12, and it never actually passes between the interlocking members 34, 44. Thus, this helps to prevent leaks in the closure mechanism 12, when the slider device 50 is in the closed position. The slider device housing 52 may be moved until the first finger 92 abuts edge of the notch 28. To open the package 10, the slider housing 52 is moved in the opposite direction to the open position. Additional information on slider devices is disclosed in U. S. provisional patent application having Ser. No. 60/108,845, filed Nov. 18, 1998, and incorporated herein by reference in its entirety.

To construct the flexible resealable package 10 with a slider device 50, the package 10 may be formed by either a blown extrusion process or by using a preformed roll of film. The film is folded in the form shown in FIG. 1. The closure mechanism 12 may be applied to the film panel sections 13, 14 by heat sealing the bonding strips 32, 42 to the film sections. The notch 28 may be cut into the upper flanges 39, 49. Next, the side seals at edges 20, 22 may be formed, for example by ultrasonic crushing. The slider 50, in particular housing 52, is then mounted over the closure mechanism 12, for example, by sliding it onto the notch 28. The sequence of these steps may be rearranged as preferred, however it is preferred that the closure mechanism 12 with notch 28 is attached to panel sections 13, 14 prior to mounting slider 50.

As indicated previously, one preferred technique for manufacturing the slider housing 52 is injection molding. While other methods are possible, injection molding is convenient and preferred. In addition, injection molding allows for ornamental features, such as ribs 75, to be molded as part of the housing 52.

C. Method and Apparatus for Mounting the Slider Device

Figure 7:
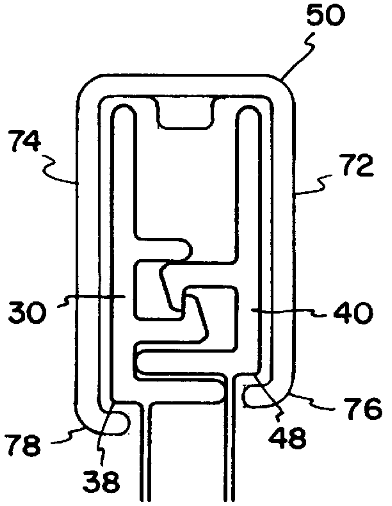
FIG. 7 is a schematic view of the profiled elements of FIG. 2 having the slider device of FIGS. 1 and 3 through 6 attached thereto.

Referring now to FIG. 7, slider device 50 has been mounted onto the closure mechanism 12 so that the legs, e.g., first and second hooking constructions 76, 78, snap over and engage the shoulders 38, 48 of the closure profiles 30, 40, respectively. Described below are automated processes for mounting of slider 50 onto closure mechanism 12 of package 10.

Figure 8:
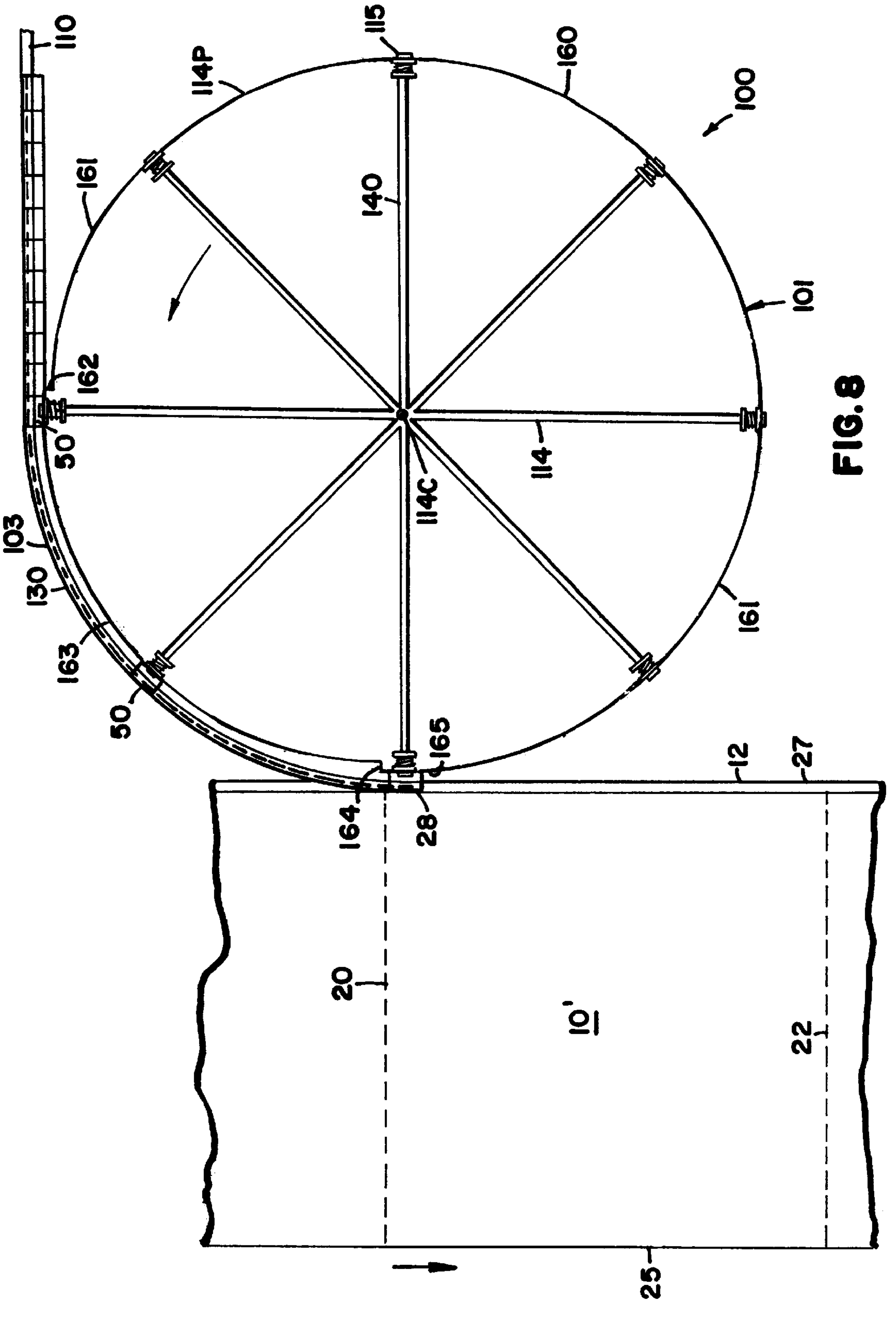
FIG. 8 is a schematic illustration of a top plan view of an apparatus used in one embodiment of a method of applying a slider device to a recloseable package.

A schematic top plan view of a mounting apparatus 100 and the process of one embodiment are shown in FIG. 8. The mounting apparatus 100 includes, in general, a system for providing a slider to be mounted onto the package, a system for transporting and positioning the slider, and a system for distorting the slider so that the slider can be mounted on the package.

As illustrated in FIG. 8, slider positioner 101 of overall mounting apparatus 100 receives slider 50 from a feed source 110 and mounts slider 50 onto closure mechanism 12 of package 10'. Package 10' moves downward from the top to the bottom (as shown in FIG. 8). Overall, mounting apparatus 100 is stationary in respect to packages 10'; however, a portion of mounting apparatus 100, slider positioner 101, rotates in a counterclockwise direction during the transporting and positioning of slider 50. It will be appreciated that the direction, speed, and the like of the various parts of the apparatus and of the packages can be varied.

Inchoate packages 10', which have not been formed as individual bags, are shown in FIG. 8 as having sliders 50 being mounted thereon. Inchoate packages 10' are positioned to be tangential to slider positioner 101 and to intersect with positioner 101 at a point, shown as "9 o'clock" in FIG. 8. Top edge 27 is shown as the right most point of package 10' closest to positioner 101; bottom edge 25 at the left of the figure. Similar to packages 10, inchoate packages 10' comprise parallel panel sections 13, 14 (not shown), typically polymeric film sheets, and closure mechanism 12 attached to panels 13, 14. Packages 10' are connected at side edges 20, 22; that is, the bags have an interior compartment formed by seams at points where the side edges 20, 22 would be, but bags have not been separated yet and remain as a continuous web. In some embodiments, the polymeric webs may not yet have any welds or seams that correspond to edges 20, 22. Preferably, however, notch 28 is present in closure mechanism 12 to aid mounting slider 50 on closure mechanism 12. Notch 28 is shown positioned close to edge 20. Further, in some embodiments, the method and apparatus of the present invention can be used to mount slider 50 on a completed package 10.

A source of sliders 50 for apparatus 100 is provided so that sliders 50 can be continuously mounted on closure mechanism 12. A conveyor system, trough, slide, chute, or the like can be used to uniformly provide sliders 50 for mounting. As illustrated in FIG. 8, a plurality of sliders 50 is retained in stacked configuration by slider feed chute 110. Preferably, sliders 50 are fed to apparatus 100 in a predetermined position. By "predetermined position", it is meant that each slider is oriented in the position desired so as to be engaged by slider positioner 101 and mounted onto closure mechanism 12. It may be desired to include an automated device to orient sliders 50 to the desired predetermined position. Each slider 50 is positioned with top wall 54 (shown in FIG. 9) facing slider positioner 101. If notch 28 in package 10' is closest to side edge 20 of package 10', as shown in FIG. 8, second end 56 of slider housing 52 is preferably the leading face of slider 50, for reasons as will be described below.

Mounting apparatus 100 generally comprises a continually regenerating mounting or positioning system for sliders 50, such as a rotatable carousel 114. FIG. 8 illustrates the rotatable carousel 114 having equidistant spaced radially extending posts 140 and a guide rail 160. Posts 140 extend from a central rotation axis 114C of carousel 114 and terminate at guide rail 160. Guide rail 160 does not rotate with posts 140 but is stationary with respect to feed chute 110 and expanding track 130 (which will be described below). Guide rail 160 acts as a cam, directing radial extension and retraction of the distal end of post 140. This is described below.

Figure 9:
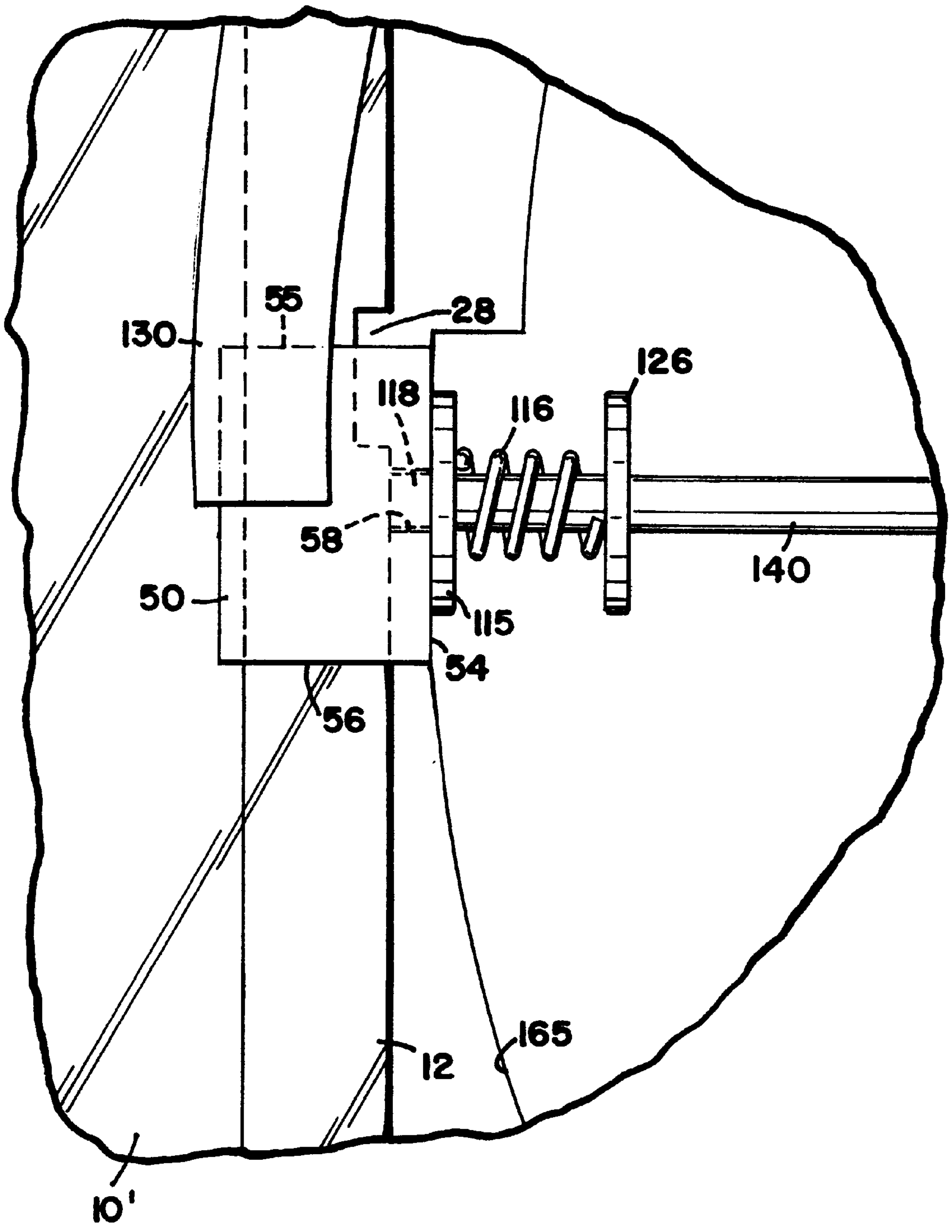
FIG. 9 is an enlarged schematic illustration of the end of an expanding track used in the apparatus of FIG. 8 just prior to a point when a slider device is mounted on a recloseable closure mechanism.

On the periphery end, that is the distal end, of each post 140 is attached an attachment apparatus for engagement with slider 50. The attachment apparatus provides controlled motion, both lateral and radial, to slider 50 from the feed chute 110 until slider 50 is mounted on closure mechanism 12. FIGS. 8 and 9 illustrate the attachment apparatus as end cap 115 at the distal end of post 140. End cap 115 is spring loaded, so that with compression of the spring 116, the radial position of end cap 115 can be retracted from a first extended position to a mid-position, and to a compressed position. An enlarged view of end cap 115 with spring 116 positioned on the end of post 140 is shown in FIG. 9. Spring 116 is retained between end cap 115 and spring base 126. The outer end of end cap 115, shown in phantom as protrusion 118 in FIG. 9, is configured and arranged to correspond to, and preferably insert into, aperture 58 shown in phantom in slider 50. The end cap 115 acts as a cam-engaging surface with the guide rail 160, explained below.

The periphery of slider positioner 101 includes the continuous guide rail 160 for controlling the radial positioning of the distal end of post 140. In the embodiment shown, guide rail 160 is essentially circular, but includes steps 162, 164 and taper 165. Steps 162, 164 separate rail sections 161, 163. Steps 162, 164 and sections 161, 163, which includes taper 165, are illustrated in FIG. 8. Section 161 is the portion of guide rail 160 that extends from approximately "12 o'clock" on carousel 114 clockwise to approximately "9 o'clock", and section 163 is the portion of guide rail 160 that extends from approximately "9 o'clock" clockwise to approximately "12 o'clock". Taper 165 is the portion of section 161 from approximately "8:30" clockwise to approximately "9 o'clock". Taper 165 is the portion of section 161 that compresses spring 116 and retracts end cap 115 from their extended position (at "9 o'clock" in FIG. 8) to the compressed position just prior to engaging slider 50 at "12 o'clock". When post 140 is within the portion of guide rail 160 defined by section 161, end cap 115 is empty; that is, no slider 50 is engaged and carried by end cap 115. When post 140 is within the portion of guide rail 160 defined by section 163, end cap 115 is engaged with slider 50 to impart lateral and radial motion to slider 50.

Guide rail 160 acts as a cam, directing radial extension and retraction of the distal end of post 140 by guiding the compression of spring 116 and thus end cap 115 during the circular travel of post 140. Guide rail 160 may be any system that provides a surface that can guide the radial position of end cap 115. For example, guide rail 160 could be a rail system, such as a split rail system, that end cap 115 abuts against or partially extends therebetween. Radial displacement of the rail system thus radially displaces end cap 115. Steps 162, 164 in guide rail 160 allow extension of spring 116 and end cap 115. Taper 165, positioned in section 161 of guide rail 160, at least partially compresses spring 116 and end cap 115 from its extended position after mounting slider 50 onto recloseable mechanism 12 (at "9 o'clock" in FIG. 8) to its compressed positioned for engagement to slider 50 (at "12 o'clock" in FIG. 8).

According to the method of the present disclosure, slider 50 is mounted on closure mechanism 12 after having at least one of the engagement legs elastically distorted so that the distance between the two hooking constructions increases. By the term "distorted" or "elastically distorted", it is meant that the hooking constructions are forced from their stable, steady state position by some force, but when the force is removed, the hooking constructions return to their original shape. Preferably, the legs comprise first and second hooking construction 76, 78. Once the distance between the two legs is increased, slider 50 can be easily mounted on closure mechanism 12.

Along the periphery of slider positioner 101 and external to guide rail 160 extends a slider expander 103 for distorting first and second hooking constructions 76, 78, which facilitates mounting slider 50 onto closure mechanism 12. The slider expander 103, together with positioner 101, provide the placement of slider 50 to achieve proper positioning of slider 50 onto closure mechanism 12. While a variety of embodiments are contemplated, FIGS. 8 through 11 illustrate the slider expander 103 as expanding track 130. Track 130 is stationary with respect to slider positioner 101 in that expanding track 130 does not rotate or otherwise move. Track 130 expands slider 50 in preparation for mounting slider 50 onto closure mechanism 12. Track 130 includes a ridge 135 (FIG. 11) positioned to accept slider 50 thereon. In a preferred embodiment, track 130 is a continuous extension of slider feed chute 110.

Track 130, in particular ridge 135 on track 130, is used to expand first and second hooking construction 76, 78 of slider 50 as slider 50 progresses along ridge 135 and track 130. FIG. 1 OA illustrates a top view of expanding track 130, and FIGS. 10B through 10E illustrate cross-sections of track 130 at several points with slider 50 positioned thereon as slider 50 move in a counterclockwise direction. FIG. 11 illustrates an enlarged side view of post 140 having slider 50 engaged on end cap 115 and positioned on ridge 135 of track 130.

At the end of track 130, shown as an enlarged top view in FIG. 9, slider 50 is mounted onto resealable closure mechanism 12 of package 10' at notch 28. A slot 138 (shown in phantom in FIG. 1) is provided in track 130 and ridge 135 through which package 10' can pass.

To mount a slider 50 onto recloseable closure mechanism 12 of inchoate package 10' or package 10 according to the principles of this disclosure , post 140 with radially moveable end cap 115 positioned thereon, engages a slider 50 from feed source 110. In FIG. 8, this action is shown at "12 o-clock", if the carousel 114 of slider positioner 101 were a clock face. Just prior to engaging slider 50, guide rail section 161 has caused end cap 115 and spring 116 to slightly compress, so that at step 162, spring 116 expands at least partially, causing end cap 115 to extend into and engage with aperture 58 of slider 50.

Once slider 50 is engaged on end cap 115, slider 50 is urged counterclockwise along expanding track 130 by the rotation of post 140. Expanding track 130 includes a tapered ridge 135 that expands first and second hooking constructions 76, 78 of slider 50 as slider 50 progresses along ridge 135. That is, as slider 50 progresses along the length of track 130, ridge 135 separates first and second hooking construction 76, 78, thereby increasing the distance therebetween. During its travel along track 130, the radial position of end cap 115 from the center of apparatus 100 is preferably held constant along rail section 163. Just short of the end of section 163 it may be desirable to have a slight decrease in rail section 163 diameter so that spring 116 is slightly compressed.

Figures 10A, 10B, 10C, 10D, 10E:
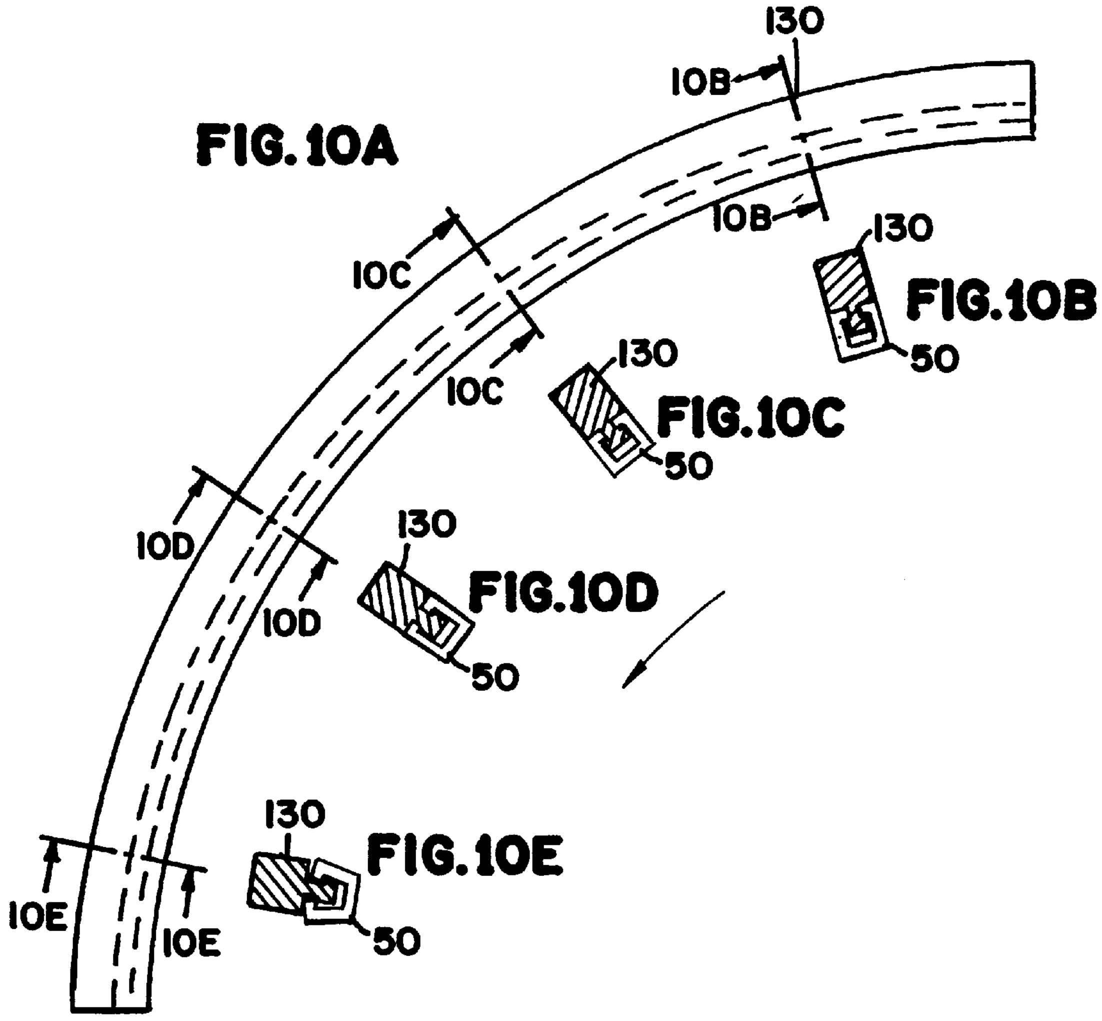
FIG. 10A is a schematic top plan view of the expanding track depicted in FIG. 9.
FIGS. 10B through 10E are cross-sectional views of the expanding track and slider device taken along lines 10B through 10E of FIG. 10A.
Figure 11:
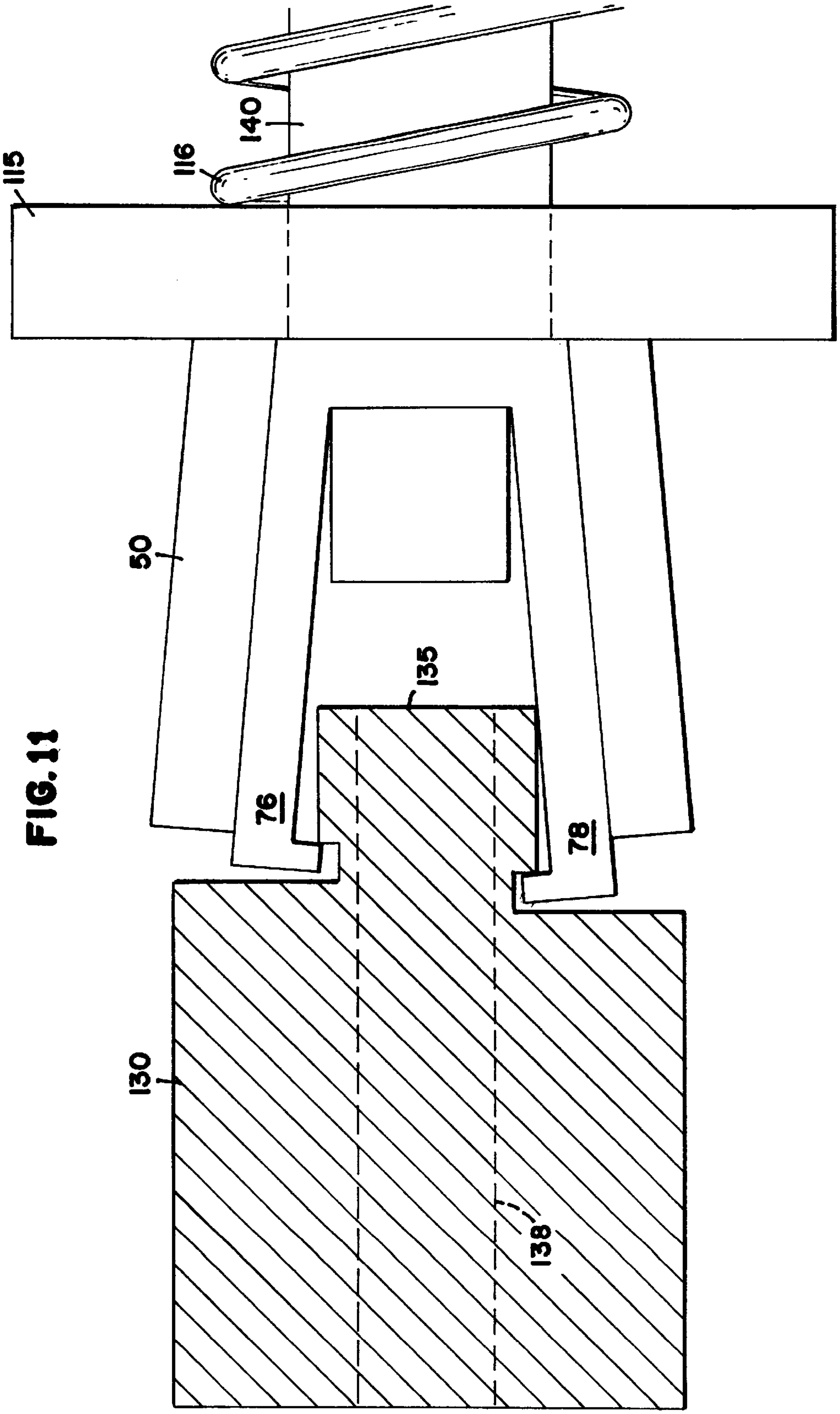
FIG. 11 is an enlarged schematic side elevational view of the expanding track having slider positioned thereon of the apparatus of FIG. 8.

FIGS. 10B through 10E show the progression of the expansion of first and second hooking constructions 76, 78 as slider 50 progresses along track 130 from "12 o-clock" to "9 o'clock" in FIGS. 8 and 10A along a counterclockwise direction. FIG. 11 shows slider 50 engaged with post 140 at aperture 58 and with ridge 135 of expanding track 130. At "12 o'clock" of FIG. 8, slider 50 has been placed on expanding track 130 and is beginning to progress counterclockwise. At this point, first and second hooking constructions 76, 78 have not been appreciably expanded. As slider 50 progresses to and past "11 o'clock", "10 o'clock" and "9 o'clock" on track 130 in FIG. 10A along a counterclockwise direction, first and second hooking constructions 76, 78 are separated by ridge 135 on track 130. FIGS. 10B through 10E show the incremental expansion of slider 50 at various points along track 130. The expansion is preferably continuous and constant.

At approximately "9 o'clock", track 130 terminates and slider 50 is mounted onto closure mechanism 12 of package 10'. To bring package 10' within an optimal distance of slider 50 for proper positioning of slider 50 on closure mechanism 12, track 130 and ridge 135 have a slit 138 therein through which package 10' can pass.

To facilitate mounting slider 50 onto package 10', step 164 may be present to help push slider 50 further onto closure mechanism 12. That is, step 164 between section 163 and section 161 of guide rail 160 allows spring 116 to expand and push end cap 115 radially outward so that slider 50 on end cap 115 better engages closure mechanism 12.

Once slider 50 has been mounted on package 10', post 140 continues its rotation around on section 161 of guide rail 160, until post 140 again reaches the "12 o'clock" where it will engage another slider 50. Soon after mounting slider 50 onto package 10', spring 116 and end cap 115 are compressed by taper 165 in guide rail 160. Spring 116 will remain at least partially compressed along section 161, until it reaches step 162, where it expands to engage slider 50.

Figure 12:
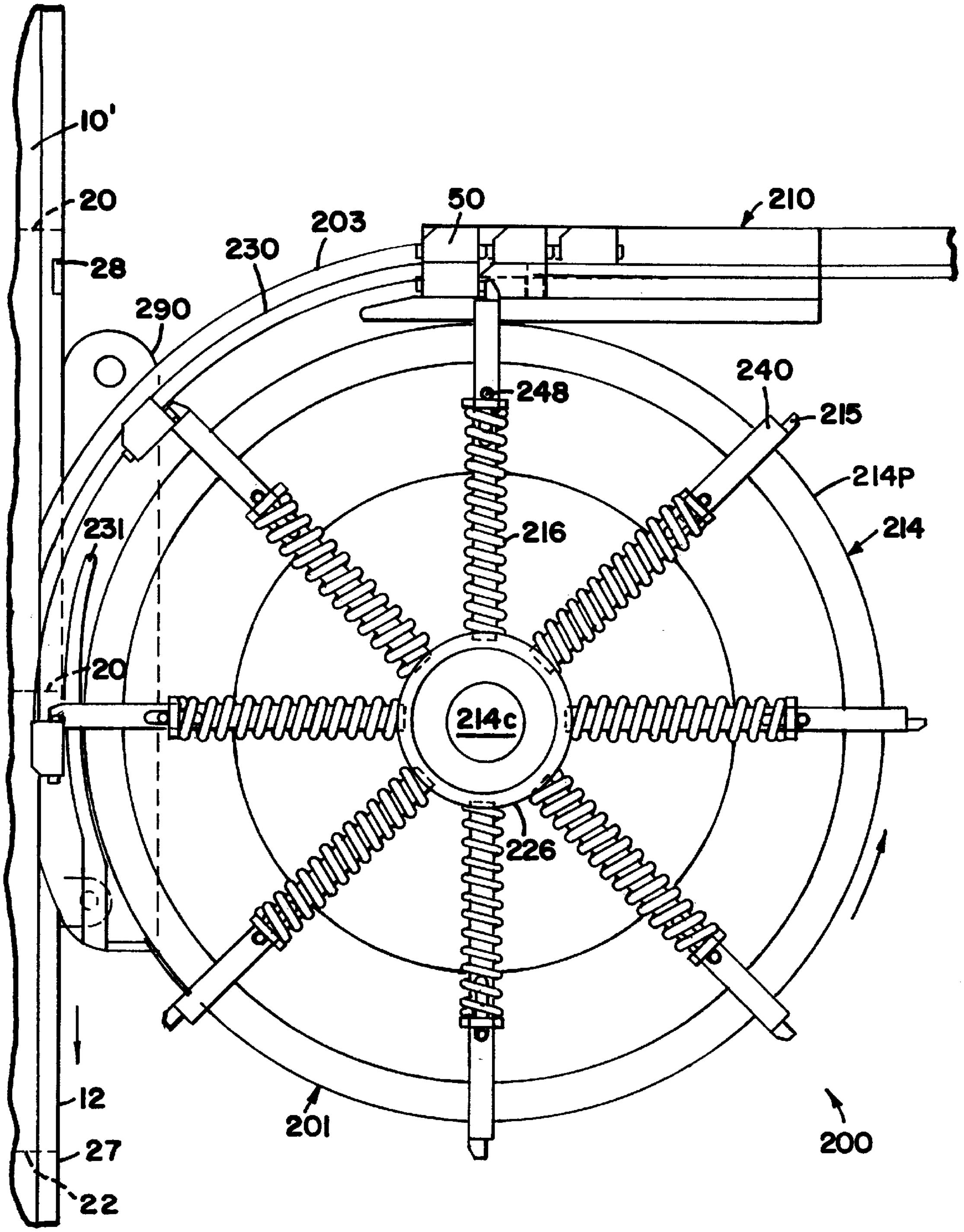
FIG. 12 is a schematic illustration of a top plan view of a second apparatus used in one embodiment of a method of applying a slider device to a recloseable package.

Referring now to FIGS. 12 through 15, a schematic top plan view of another embodiment of mounting apparatus 200 for mounting slider device 50 onto closure mechanism 12 and the process thereof are shown in FIG. 12. The mounting apparatus 200 includes, in general, a system for providing a slider device to be mounted onto the package, a system for transporting and positioning the slider, and a system for distorting the slider so that the slider can be mounted on the package.

As illustrated in FIG. 12, slider positioner 201 of overall mounting apparatus 200 receives slider 50 from a feed source 210 and mounts slider 50 onto closure mechanism 12 of package 10'. Package 10' moves downward from the top of the figure to the bottom. Overall, mounting apparatus 200 is stationary with respect to packages 10'; however, a portion of mounting apparatus 200, slider positioner 201, rotates in a counterclockwise direction during the transporting and positioning of slider 50. It will be appreciated that the direction, speed, and the like of the various parts of the apparatus and of the packages can be varied.

Inchoate packages 10', which have not been formed as individual bags, are shown in FIG. 12 as having sliders 50 being mounted thereon. Inchoate packages 10' are positioned to be tangential to slider positioner 201 and to intersect with positioner 201 at a point, shown at "9 o'clock" in FIG. 12 if slider positioner 201 were a clock face. Top edge 27 of package 10' is shown as the right most point of package 10' closest to positioner 201; bottom edge 25 (not shown) would be at the left most portion of the figure. Inchoate packages 10', or packages 10, onto which slider 50 is positioned according to the method of this embodiment, are the same as those packages used in the embodiment illustrated in FIGS. 8 through 11.

Figure 13:
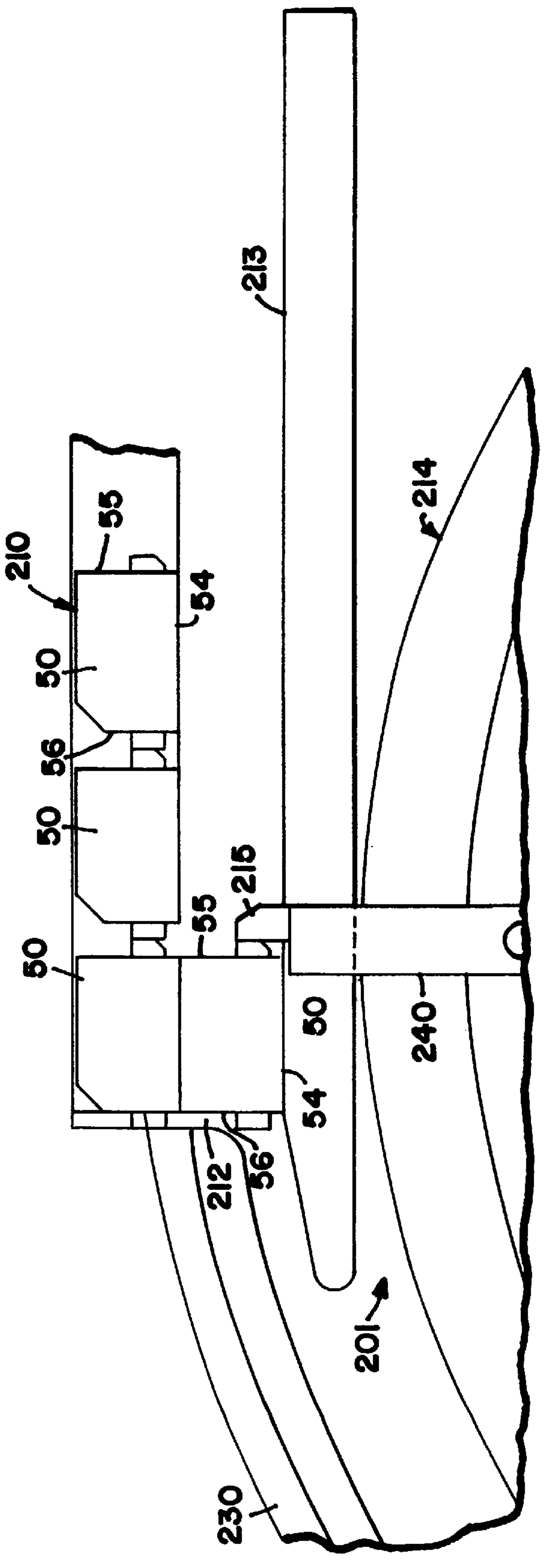
FIG. 13 is an enlarged schematic illustration of the feed chute used in the apparatus of FIG. 12.

A source of sliders 50 for apparatus 200 is provided so that sliders 50 can be continuously mounted on closure mechanism 12. A conveyor system, trough, slide, chute, or the like can be used to uniformly provide sliders 50 for mounting. As illustrated in FIGS. 12 and 13, a plurality of sliders 50 is retained in stacked configuration by slider feed chute 210, slider loading bay 212 (FIG. 13) and stop 213 (FIG. 13). Sliders 50 are singularly fed via chute 210 to loading bay 212 (FIG. 13) where a slider 50 is retained by stop 213 (FIG. 13) until end cap 215 of post 240 engages slider 50, as will be discussed in detail later. Stop 213 (FIG. 13) is an elongate member against which slider 50 abuts so that motion of slider 50 is halted until slider 50 is pushed laterally along stop 213 and onto track 230 by post 240.

Preferably, slider 50 is provided to apparatus 200 in a predetermined position. By "predetermined position", it is meant that each slider is oriented in the position desired so as to be engaged by slider positioner 201 and mounted onto closure mechanism 12. It may be desired to include an automated device to orient sliders 50 to the desired predetermined position. Each slider 50 is positioned in chute 210 so that when in slider loading bay 212, top wall 54 of slider 50 is against stop 213 (as shown in FIG. 13). If notch 28 in package 10' is closest to side edge 20 of package 10', as shown in FIG. 12, second end 56 (FIG. 13) of slider housing 52 is preferably the leading face of slider 50, for reasons as will be described below.

Mounting apparatus 200 generally comprises a continually regenerating mounting or positioning system 201 for sliders 50, such as a rotatable carousel 214. FIG. 12 illustrates the rotatable carousel 214 having equidistant spaced radially extending posts 240 extending out from a central rotation axis 214C and terminating near carousel periphery 214P.

Figure 14:
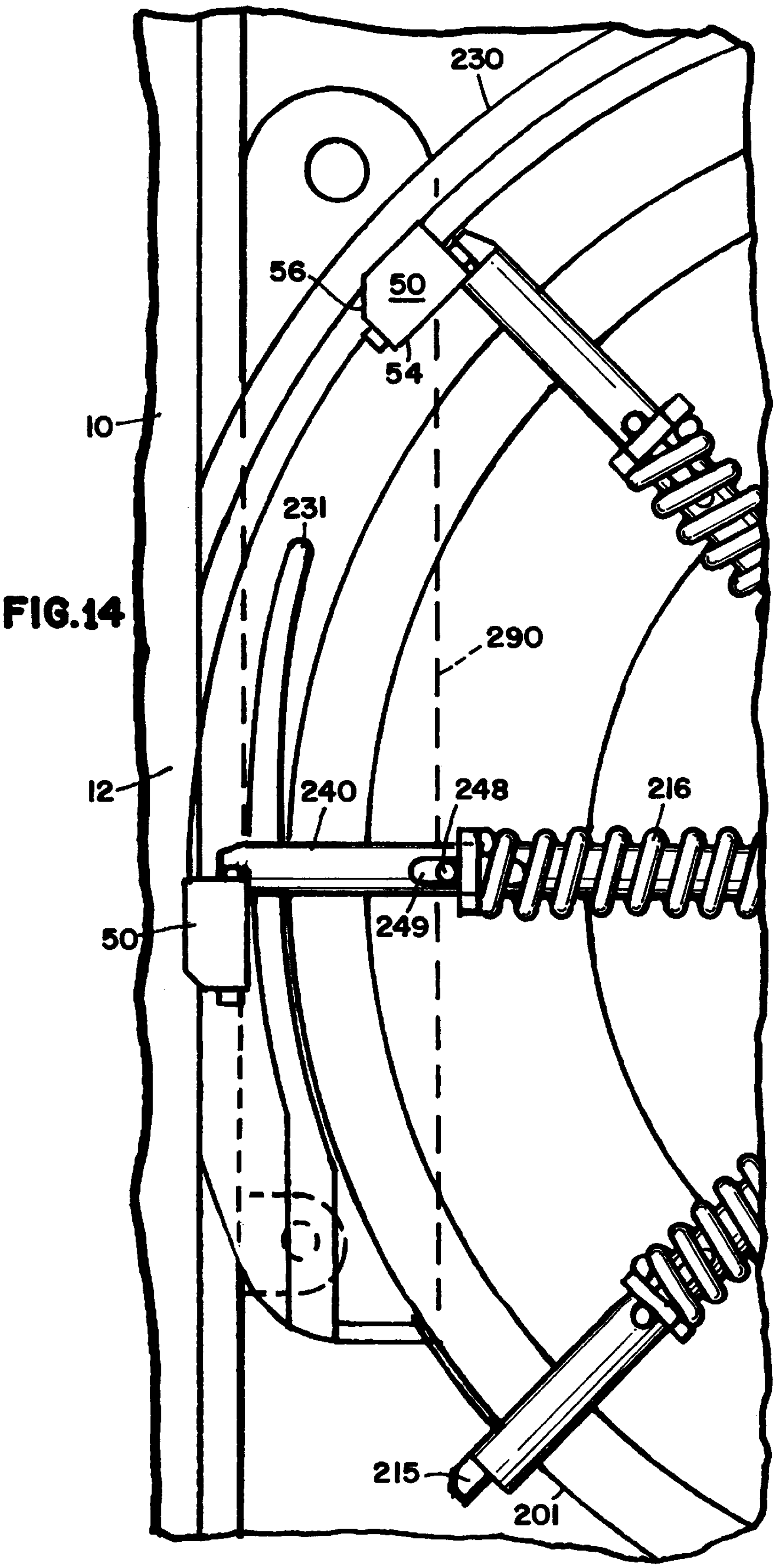
FIG. 14 is an enlarged schematic illustration of the end of an expanding track used in the apparatus of FIG. 12 just prior to a point when a slider device is mounted on a recloseable closure mechanism.

At the periphery 214P, the distal end of each post 240 has an apparatus for engagement with slider 50. The apparatus controls lateral motion of slider 50 from when slider 50 is positioned in loading bay 212 until slider 50 is mounted on closure mechanism 12. FIGS. 12, 13 and 14 show the apparatus as end cap 215 at the distal end of post 240. In a preferred embodiment, end cap 215 has an elongate body which terminates at guide post 248. Post 240 is hollow at least at its distal end to allow insertion of end cap 215 with its elongate body into post 240. A radially extending slot 249

(FIG. 14) in post 240 is adapted and configured for extension of guide post 248 therethrough and radial movement of guide post 248 therein. Preferably, post 240 has two opposite slots 249 therein to allow extension of guide post 248 through post 240, that is, from one side through to the other. In FIGS. 12, 13 and 14, guide post 248 extends upward out of the page and downward into the page.

The position of end cap 215 can be radially retracted from a first extended position to a compressed position by compression of spring 216 on post 240. Wall 290, shown in FIGS. 12 and 14, can be used to compress spring 216 by providing a surface which prohibits total radial extension of guide post 248. Spring 216 is retained on the exterior surface of post 240 between guide post 248 of end cap 215 and spring base 226. Spring base 226 is shown in FIG. 12 as a circular lip extending near the center of carousel 214; however, spring base 226 may be any mechanism at which spring 216 terminates. The outer end of end cap 215 is configured to abut against slider 50 and to push slider 50 along expanding track 230. Preferably, end cap 215 pushes slider 50 by first end 55.

According to the method of the present invention, slider 50 is mounted on closure mechanism 12 after having at least one of the engagement legs distorted so that the distance between the two leg constructions increases. Preferably, the engagement legs comprise first and second hooking construction 76, 78 (shown in FIGS. 4 through 7 and 15). After the distance between the two legs is increased, slider 50 can be easily mounted on closure mechanism 12.

Along a portion of the periphery 214P of slider positioner 201 extends a slider expander 203 for distorting first and second hooking constructions 76, 78, which facilitates mounting slider 50 onto closure mechanism 12. The slider expander 203, together with positioner 201, provide slider 50 with proper positioning on closure mechanism 12. While a variety of embodiments are contemplated, FIGS. 12 through 15 illustrate the slider expander 203 as expanding track 230. Track 230 is stationary with respect to slider positioner 201, in that expanding track 230 does not rotate or otherwise move. Track 230 expands slider 50, in particular, at least one of first and second hooking construction 76, 78, in preparation for mounting slider 50 onto closure mechanism 12. In a preferred embodiment, track 230 is a continuous extension of slider feed chute 210.

Figure 15:
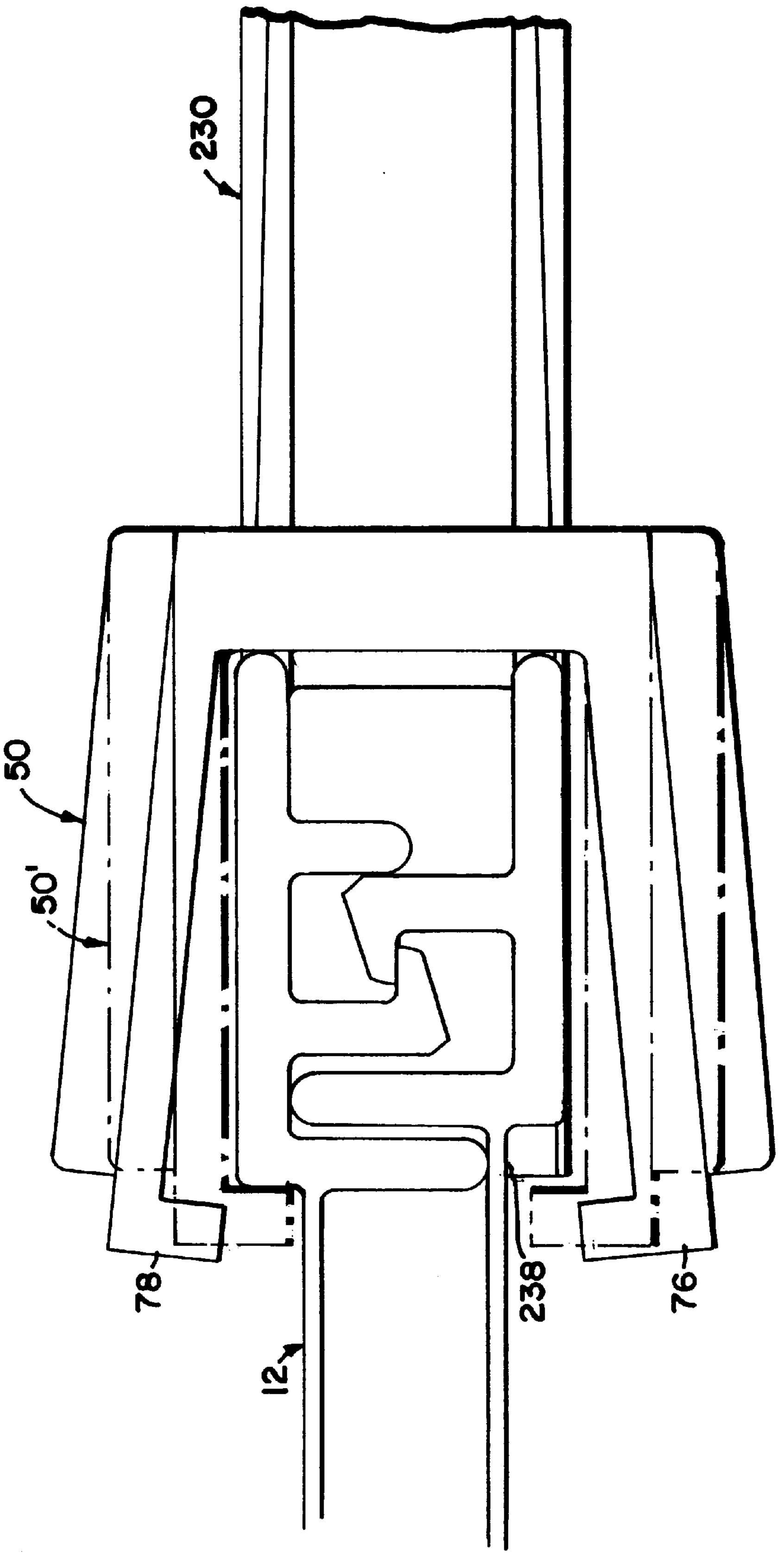
FIG. 15 is an enlarged schematic side elevation view of the expanding track having slider positioned thereon of the apparatus of FIG. 12.

Track 230 expands first and second hooking construction 76, 78 of slider 50 as slider 50 progresses along track 230. FIG. 15 illustrates an enlarged side view of expanded slider 50 positioned on track 230. A phantom unexpanded slider 50' is shown in FIG. 15 as a comparison to expanded slider 50 at that end point on track 230. At the end of track 230 in FIG. 15, slider 50 is mounted onto resealable closure mechanism 12 so that it is positioned as shown by slider 50'. A slot 238 adapted and configured for insertion of closure mechanism 12 therein is provided in track 230 for insertion of closure mechanism 12 of package 10' therein. Slot 238 typically does not extend the entire length of track 230, but is only present in the last few inches of track 230 where packages 10' intersect with carousel 214. See for example, FIGS. 12 and 14; slot 238 (not depicted in FIGS. 12 and 14) would extend within track 230 at least where closure 30 mechanism 12 overlaps track 230. In FIG. 12, slot 238 would extend within track 230 from about "10 o'clock" counterclockwise to the end of track 230. Slot 238 preferably gradually increases its depth within track 230, so that at the end of track 230, closure mechanism 12 is entirely within slot 238 in track 230. Together, slot 238 and track 230 align closure mechanism 12 and expanded slider 50 for proper mounting of slider 50 on closure mechanism 12. A pressure cam 231 (shown in FIGS. 12 and 14) can be used to help properly align slider 50 on closure mechanism 12.

To mount a slider 50 onto recloseable closure mechanism 12 of inchoate package 10' or package 10 according to the method of the present invention, post 240 with radially moveable end cap 215 positioned thereon engages a slider 50 from feed source 210. In FIG. 12, this action is shown at "12 o-clock", if the carousel 214 of slider positioner 201 were a clock face. End cap 215 is in its extended-most position with guide post 248 urged by spring 216 to the outer most end of slot 249.

Slider 50 located in loading bay 212 (FIG. 13) is engaged by end cap 215 at end 55 (FIG. 13) and is urged counterclockwise along expanding track 230 by the rotation of post 240 around axis 214C of carousel 214. From loading bay 212, slider 50 is pushed onto expanding track 230, which causes first and second hooking constructions 76, 78 of slider 50 to expand as slider 50 progresses along track 230. That is, as slider 50 progresses along the length of track 230, track 230 gradually separates first and second hooking construction 76, 78, thereby increasing the distance therebetween. During the travel along the majority of track 230, the radial position of end cap 215 from the center 214C of apparatus 200 is preferably in the extended-most position. Guide post 248 and spring 216 are unhindered, so that spring 216 is allowed to extend outward as far as guide post 248 can move within slot 249.

Just prior to the "9 o'clock" position when moving counterclockwise, (approximately at "10 o'clock"), wall 290 provides a cam surface against which guide post 248 abuts. Wall 290 is shown in phantom in FIG. 12 because in the embodiment shown, wall 290 is positioned below carousel 214 when viewed from a top plan view. Wall 290 is positioned so that wall 290 abuts guide post 248 (i.e., the portion of guide post 248 extending down into the page) as post 240 nears the mounting position at "9 o'clock" (FIG. 14). As post 240 continues its rotation, guide post 248 is pushed inward along slot 249 by wall 290, thereby compressing spring 216 and shortening the overall length of post 240 and radial position of end cap 215. As shown in FIG. 14, at "9 o'clock", spring 216 is the most compressed by wall 290 abutting guide post 248 so that end cap 215 has the shortest radial position from center 214C.

At approximately "9 o'clock", track 230 terminates and slider 50 is mounted onto closure mechanism 12 of package 10'. When track 230 ends, slider 50 is pushed off of track 230 by end cap 21 and onto closure mechanism 12. At this point, closure mechanism 12 is positioned in slot 238 track 230. Slot 238 and track 230 align expanded slider 50 and closure mechanism 12 for proper mounting of slider 50 on closure mechanism 12. At the very end of track 230, slider 50 is pushed off of track 230 by end cap 215, slider 50 mounts on to closure mechanism 12, and hooking constructions 76, 78 return to their original position and shape. To facilitate accurate mounting slider 50 onto closure mechanism 12 of package 10', pressure cam 231 guides slider 50 into proper position on closure mechanism 12.

Once slider 50 has been mounted on package 10', post 240 continues its rotation around carousel 214, until post 240 again reaches the "12 o'clock" where it will engage another slider 50.

The above specification and examples are believed to provide a complete description of the manufacture and use of particular embodiments of the invention. Many embodiments of the invention can be made without departing from the spirit and scope of the invention.

We claim:

1. A method of mounting a slider device on a recloseable closure mechanism for a resealable package comprising:

(a) providing a package having a recloseable closure mechanism;

(b) providing a slider device for opening and closing the recloseable closure mechanism, the slider device having first and second leg constructions having a first distance therebetween;

(c) expanding the slider device to increase the first distance between the first and second leg constructions to a second distance, wherein the expanding comprises moving the slider device along an expanding device;

(d) removing the slider device from the expanding device;

(e) mounting the slider device onto the recloseable closure mechanism; and (f) decreasing the second distance between the first and second leg constructions to a third distance.

2. The method according to claim 1 wherein the step of providing the slider device comprises using a rotating carousel having a central axis to move the slider device from a chute to a track.

3. The method according to claim 2 wherein the step of providing the slider device comprises using the rotating carousel comprising a radially extending post to engage the slider device.

4. The method according to claim 3 wherein the step of providing the slider device comprises using a radially extending post having a spring thereon.

5. The method according to claim 4 wherein the step of providing the slider device comprises compressing the spring against a cam surface.

6. The method according to claim 3 wherein the step of providing the slider device comprises using the rotating carousel comprising a plurality of radially extending posts to engage a plurality of slider devices.

7. The method according to claim 6 wherein the step of providing the slider device comprises using a plurality of radially extending posts, each post having a spring thereon.

8. The method according to claim 7 wherein the step of providing the slider device comprises compressing the spring against a cam surface.

9. The method according to claim 1 wherein the step of expanding the slider device comprises moving the slider device along a tapered expanding device.

10. The method according to claim 1 wherein the step of providing a slider device having first and second leg constructions comprises providing a slider device having first and second hooking constructions for engaging the recloseable closure mechanism.

11. An apparatus for mounting a slider device to a recloseable closure mechanism, the slider device having first and second opposite leg constructions having a first distance therebetween, the apparatus comprising:

(a) a slider device positioner system comprising a rotating carousel;

(b) a slider distorting system comprising a track configured and adapted to expand at least one of the first and second leg constructions from the first distance to a second distance; and (c) a slider mounting system constructed and arranged to align the slider device with the recloseable closure mechanism.

12. The apparatus according to claim 11 wherein the rotating carousel comprises a plurality of radially extending posts.

13. The apparatus according to claim 12 wherein each of the plurality of radially extending posts includes a spring constructed and arranged to compress and expand.

14. The apparatus according to claim 13 wherein each of the plurality of radially extending posts includes a guide post constructed and arranged to engage with the spring.

15. The apparatus according to claim 12 wherein each of the plurality of radially extending posts is constructed and arranged to engage with the slider device.

16. The apparatus according to claim 15 wherein the rotating carousel is constructed and arranged to push the slider device along the slider distorting system.

17. The apparatus according to claim 11 wherein the track comprises a slot therein constructed and arranged to receive the recloseable closure mechanism therein.

18. The apparatus according to claim 17 wherein the slot is constructed and arranged for insertion of the recloseable closure mechanism therein.

19. A method of mounting a slider device on a recloseable closure mechanism for a resealable package comprising:

(a) providing a package having a recloseable closure mechanism;

(b) providing a slider device for opening and closing the recloseable closure mechanism, the slider device having first and second leg constructions having a first distance therebetween;

(c) positioning the slider device by using a rotating carousel comprising a plurality of radially extending posts, each post having a compressible spring thereon, and each post constructed and arranged to engage the slider device;

(d) moving the slider device along an expanding track;

(e) expanding the slider device to increase the first distance between the first and second leg constructions to a second distance;

(f) removing the slider device from the expanding device;

(g) mounting the slider device onto recloseable closure mechanism; and (h) decreasing the second distance between the first and second leg constructions to a third distance.

20. The method according to claim 19 wherein the steps of moving the slider device and expanding the slider device are done simultaneously.

* * * * *